(12) United States Patent
Gilberton et al.

(10) Patent No.: US 9,390,537 B2
(45) Date of Patent: Jul. 12, 2016

(54) DISPARITY SETTING METHOD AND CORRESPONDING DEVICE

(71) Applicant: Thomson Licensing, Issy de Moulineaux (FR)

(72) Inventors: Philippe Gilberton, Cesson Sevigne (FR); Anthony Laurent, Cesson Sevigne (FR); Eric Gautier, Cesson Sevigne (FR)

(73) Assignee: Thomson Licensing (FR)

( * ) Notice: Subject to any disclaimer, the term of this patent is extended or adjusted under 35 U.S.C. 154(b) by 120 days.

(21) Appl. No.: 13/687,289

(22) Filed: Nov. 28, 2012

(65) Prior Publication Data

US 2013/0147791 A1    Jun. 13, 2013

(30) Foreign Application Priority Data

Dec. 9, 2011    (FR) ...................................... 11 61399

(51) Int. Cl.
*G06T 15/00*    (2011.01)
*H04N 13/00*    (2006.01)
*H04N 13/04*    (2006.01)

(52) U.S. Cl.
CPC ............ *G06T 15/00* (2013.01); *H04N 13/0022* (2013.01); *H04N 13/0438* (2013.01); *H04N 13/0497* (2013.01); *G09G 2320/0209* (2013.01); *H04N 13/0429* (2013.01); *H04N 2013/0465* (2013.01); *H04N 2213/008* (2013.01)

(58) Field of Classification Search
None
See application file for complete search history.

(56) References Cited

U.S. PATENT DOCUMENTS

| 6,687,399 | B1 | 2/2004 | Chuang et al. | |
|---|---|---|---|---|
| 7,440,004 | B2 | 10/2008 | Siegel et al. | |
| 2010/0066816 | A1 | 3/2010 | Kane et al. | |
| 2010/0177174 | A1 | 7/2010 | Ko et al. | |
| 2010/0194857 | A1 | 8/2010 | Mentz et al. | |
| 2011/0001808 | A1 | 1/2011 | Mentz et al. | |
| 2011/0025821 | A1* | 2/2011 | Curtis et al. | .................... 348/43 |
| 2011/0267442 | A1 | 11/2011 | Imai et al. | |
| 2012/0007967 | A1* | 1/2012 | Kondo et al. | .................... 348/54 |

(Continued)

FOREIGN PATENT DOCUMENTS

| EP | 2378783 | 10/2011 |
|---|---|---|
| JP | 3053793 | 3/1991 |
| WO | WO2010091113 | 8/2010 |

OTHER PUBLICATIONS

French Search Report dated Aug. 27, 2012.
(Continued)

*Primary Examiner* — Carlos Perromat
*Assistant Examiner* — Xin Sheng
(74) *Attorney, Agent, or Firm* — Jack Schwartz & Associates, PLLC

(57) ABSTRACT

The invention relates to a method for transmitting an information representative of a disparity setting of a stereoscopic image, the stereoscopic image comprising a first image and a second image representative of a same scene according to two different viewpoints. The method comprises a transmission step of said setting information at a given time, the transmission time being determined according to a time period associated with a transition time between the sequential display of the first and second images. The invention also relates to a disparity setting method according to the disparity information received as well as a device configured for the transmission of an information representative of a disparity setting.

14 Claims, 7 Drawing Sheets

(56) References Cited

U.S. PATENT DOCUMENTS

Figure 1A:
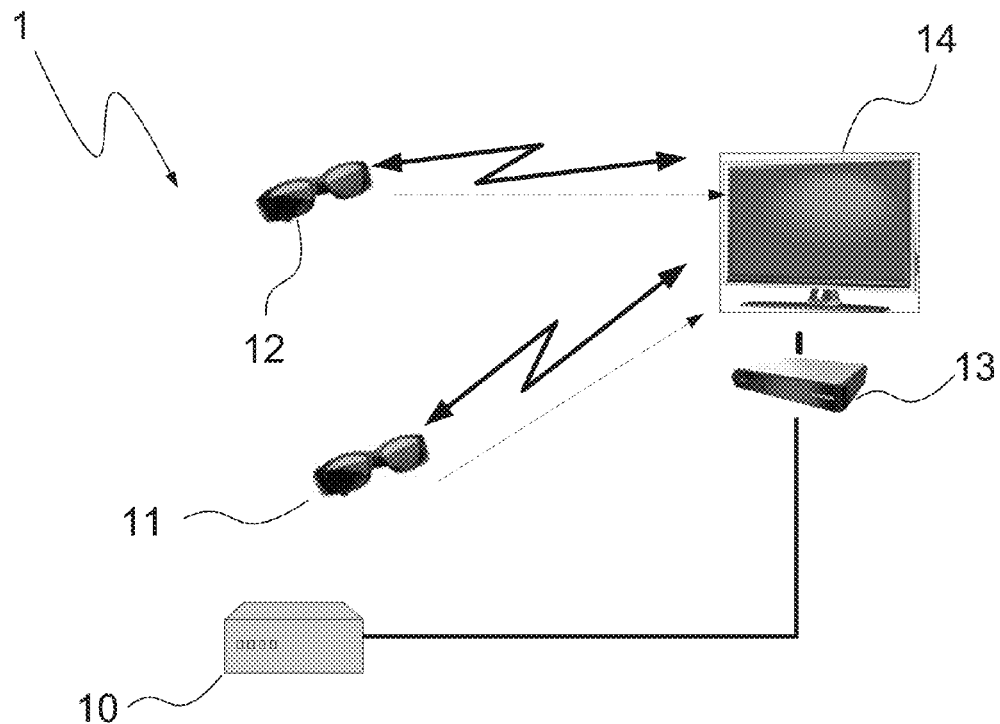

2012/0182397 A1* 7/2012 Heinzle et al. .................. 348/47
2013/0300637 A1* 11/2013 Smits et al. ...................... 345/8

OTHER PUBLICATIONS

Didier Doyen et al. :3D Intensity Adjustment of a Stereo Content to Improve Quality of Experience, http://nem-summit.eu/wp-content/plugins/alcyonis-event-agenda/files/Papers_NEM_Summit_Technicolor_Doyen.pdf.
David M. Hoffman et al., "Vergence-Accommodation Conflits hinder Visual Performance and Case Visual Fatigue" Journal of Vision, DOI 10.10.1167/8.3.33, ISSN 1534-7362, Mar. 28, 2008.
http://en.wikipedia.org/wiki/Binocular_disparity.
http://www.legitreviews.com/print/print?post_id=889.
http://www.nvidia.fr/object/buy-wireless-3d-glasses-fr.html.

* cited by examiner

DISPARITY SETTING METHOD AND CORRESPONDING DEVICE

This application claims the benefit, under 35 U.S.C. §119 of FR Patent Application 1161399, filed 9 Dec. 2011.

1. SCOPE OF THE INVENTION

The invention relates to the field of setting characteristics of 3D images and/or video, that is in three dimensions. The invention also relates to the field of the exchange of information between different devices associated for the rendering of 3D images.

2. PRIOR ART

According to the prior art, there are several methods used in video processing to restore a perception of relief, for example by stereoscopy. In stereoscopy, two views of a same scene are recorded, with two different video cameras or two different cameras, from two different viewpoints shifted laterally with respect to each other. These two views of the same scene are displayed on a display device (for example a PDP (Plasma Display Panel) type, or LCD (Liquid Crystal Display) type or by means of a video projector) either in a sequential manner temporally (left image then right image and so on) or in a spatially interleaved manner (line of the left image then line of the right image and so on) to restore the perception of relief, that is depth information. The amplitude of a 3D effect or the perception of a relief in a 3D image depends directly on the disparity of the left and right images, that is the distance (measurable in number of pixels for example) separating two pixels, that is one pixel for the left image and one pixel for the right image, representing the same video information at the level of the display device, that is representing the same element of the recorded scene. Generally, the disparity of the left and right images of a film or a video is fixed and decided upon by the director and corresponds to the distance between the left and right cameras filming the scene, these two cameras being most often separated by a distance equal to 6.5 cm, which corresponds to the average distance separating the eyes of an individual.

The chosen distance between the cameras corresponding to an average, the need to adapt the disparity, that is to adapt the amplitude of the 3D effects, is felt so that each individual who watches a film or a 3D image can adapt the disparity of the left and right images of a stereoscopic 3D image to his view to avoid or reduce a visual fatigue. Moreover, large 3D effects can inconvenience some spectators who thus seek to adjust the amplitude of the 3D effects, that is to set the depth of the images.

Moreover, it is known to associate an active pair of glasses with a 3D display device for the rendering of a stereoscopic content (3D image or 3D video). In systems using active glasses, the left and right images of a stereoscopic content are displayed sequentially, i.e. one after the other on the display device. It is then necessary that the associated (active) glasses can block the vision of the eye which must not see the displayed image while the other eye watches it (for example, only the right eye must be able to watch the right image and only the left eye must be able to watch the left image). This is obtained by the use of active glasses which integrate for example a LCD ("Liquid Crystal Display") panel per lens, the LCD panel letting the light pass or not, i.e. the displayed (right or left) image. To do this, the active glasses must be synchronized with the display device so that the blocking of the vision of the left eye only occurs during the display of the right image and so that the blocking of the vision of the right eye only occurs during the display of the left image. The active glasses associated with a given 3D display device are therefore synchronized with the latter and controlled by the latter.

The setting of the amplitude of the 3D effects by one or more people equipped with active glasses and watching a stereoscopic content on a suitable display device poses several problems, for example as to the synchronisation of the display of the images of the stereoscopic content with the blanking of the lenses of the active glasses.

3. SUMMARY OF THE INVENTION

The purpose of the invention is to overcome at least one of these disadvantages of the prior art.

More particularly, the invention is notably designed to optimise the processing of disparity setting information of a stereoscopic content so as not to interfere with the synchronisation of different 3D devices involved in the rendering of the stereoscopic content.

The invention relates to a method for transmitting an information representative of a disparity setting of a stereoscopic image, the stereoscopic image comprising at least a first image and a second image representative of a same scene according to two different viewpoints. The method comprises a transmission step of the setting information at a given time, the transmission time belonging to a time slot during which a lens of an active pair of glasses is in an established open or closed state.

According to a particular characteristic, the time slot during which a lens of an active pair of glasses is in an established open or closed state is determined according to a reception time of a synchronisation signal.

Advantageously, the transmission time belongs to the start of the time slot during which one lens of an active pair of glasses is in an established open or closed state.

According to a specific characteristic, the method comprises a storage step of the information representative of a disparity setting in a memory before transmission.

In an advantageous manner, the information representative of a disparity setting is transmitted via a wireless transmission channel.

Advantageously, the stereoscopic image belongs to a video stream comprising a first image and at least two second images, a different disparity information being associated with each second image.

The invention also relates to a method for adjusting a disparity level of a stereoscopic image, the stereoscopic image comprising a first image and a second image representative of a same scene according to two different viewpoints, the method comprising a reception step of an information representative of a disparity setting, a setting step of the disparity level of the stereoscopic image according to the information representative of a received disparity setting, the setting being processed at a different time from a transition time between the display of the first image and the display of the second image.

According to another characteristic, the method comprises a transmission step of a synchronisation signal, the synchronisation signal comprising an information representative of the display sequence of the first and second images.

According to a particular characteristic, the method further comprises a storage step of the information representative of a disparity setting received in a memory before the disparity level is set.

Advantageously, the processing time of the setting belongs to a time slot corresponding to the display of one of the first and second images.

The invention further relates to a device configured for a transmission of an information representative of a disparity setting of a stereoscopic image comprising a first image and a second image, the device comprising a transmitter configured for the transmission of the information representative of a disparity setting, a calculation unit configured to determine a transmission time of the information representative of a disparity setting belonging to a time slot during which a lens of an active pair of glasses is in an established open or closed state.

Advantageously, the device comprises a receiver configured for the reception of a synchronisation signal comprising an information representative of the display sequence of the first and second images.

According to another characteristic, the device comprises command means configured to modify the disparity setting of the stereoscopic image.

4. LIST OF FIGURES

Figure 1B:
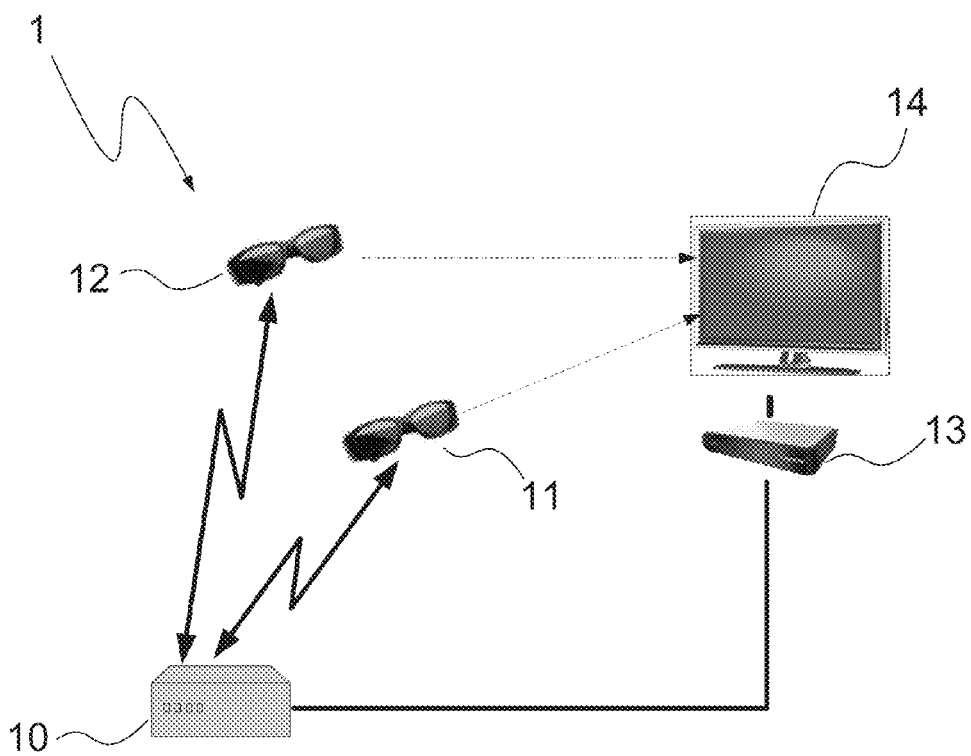
Figure 2:
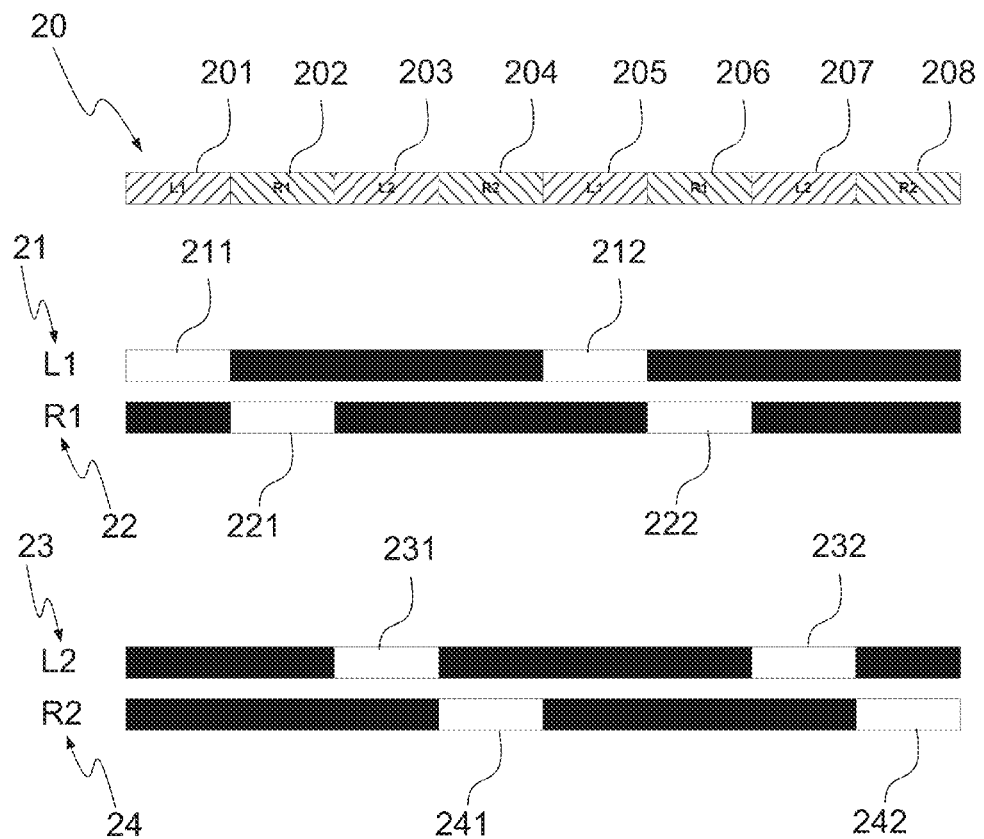
Figure 3:
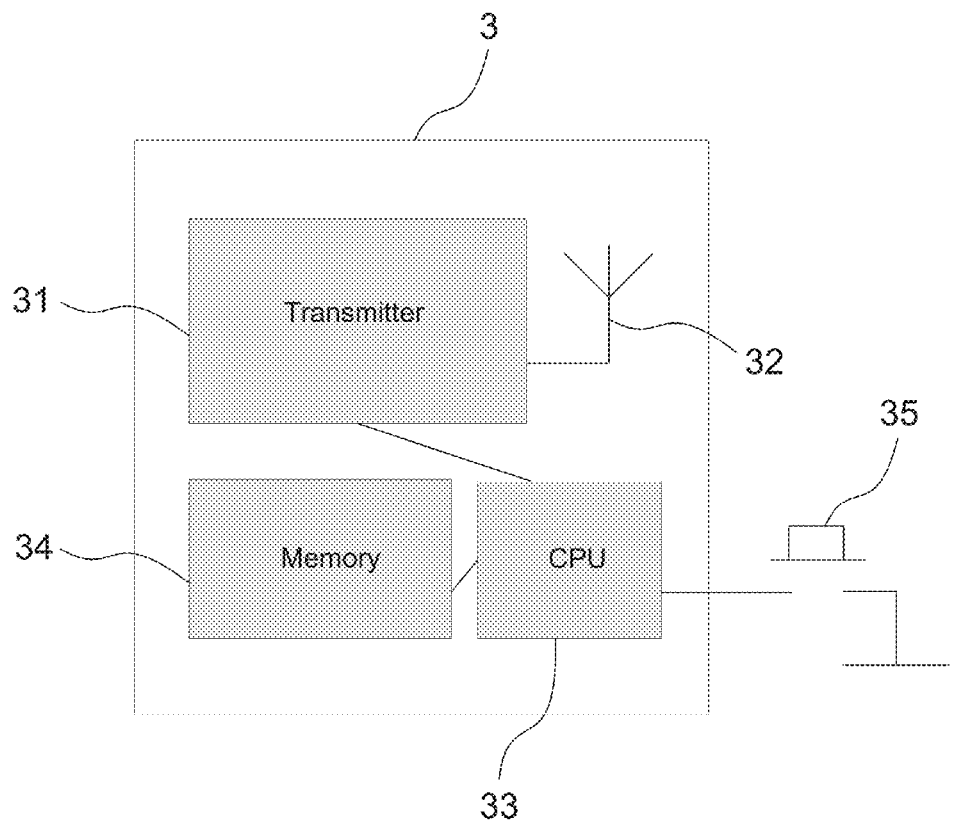
Figure 4:
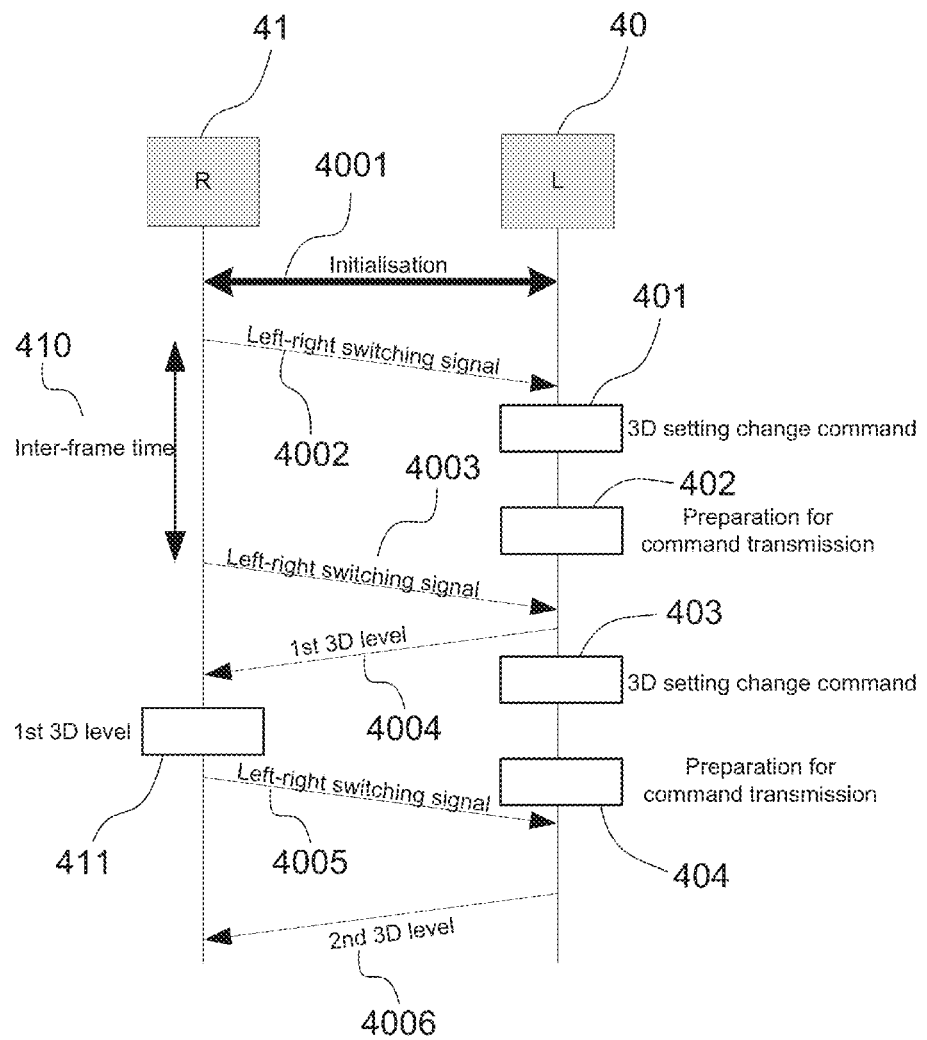
Figure 5A:
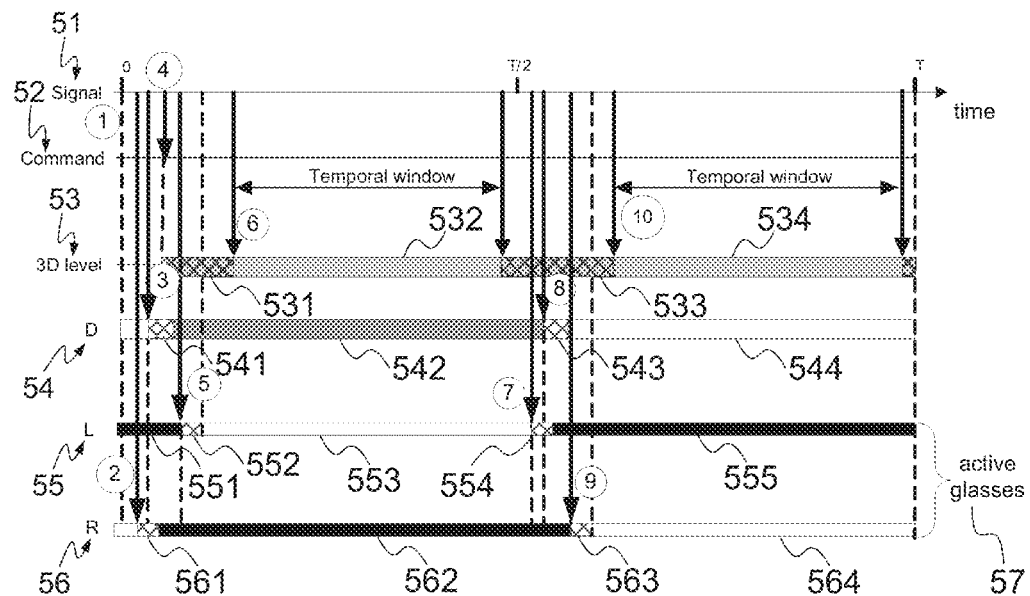
Figure 5B:
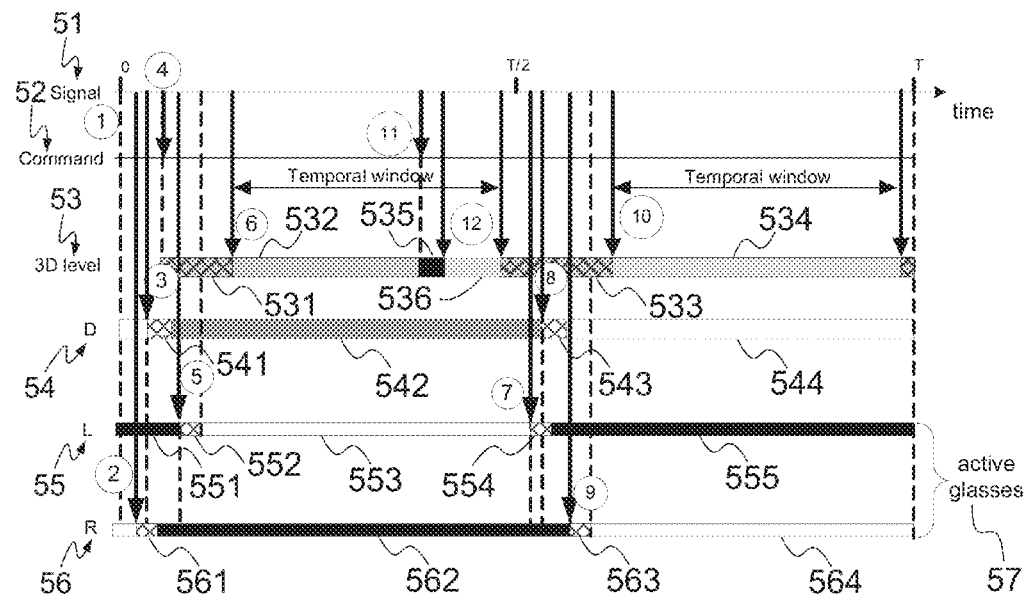
Figure 6:
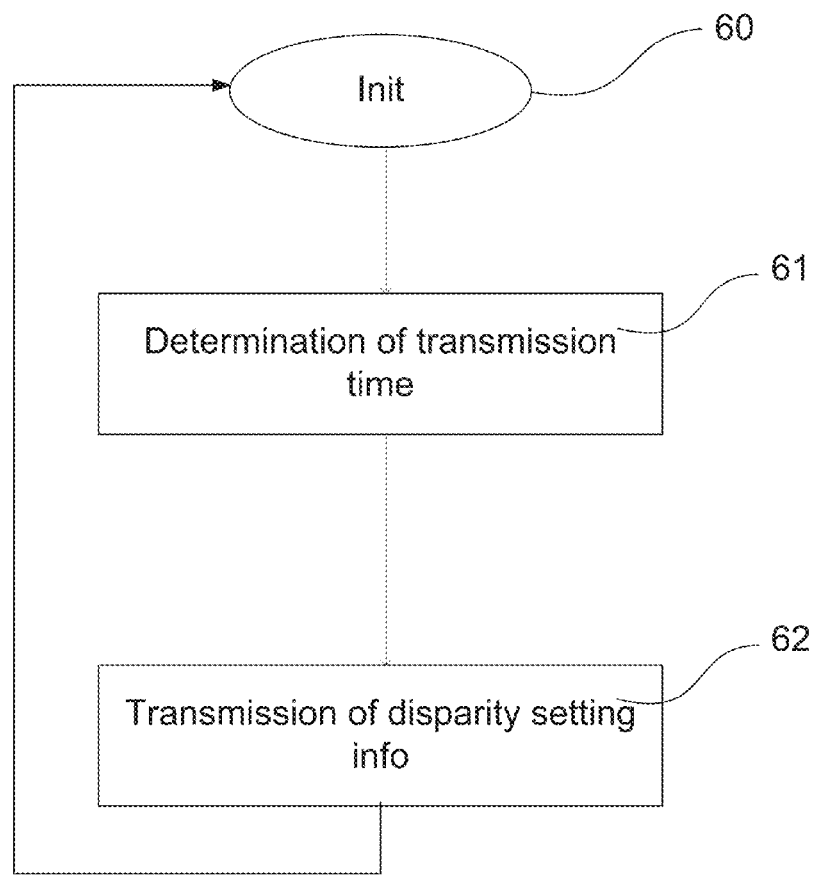
Figure 7:
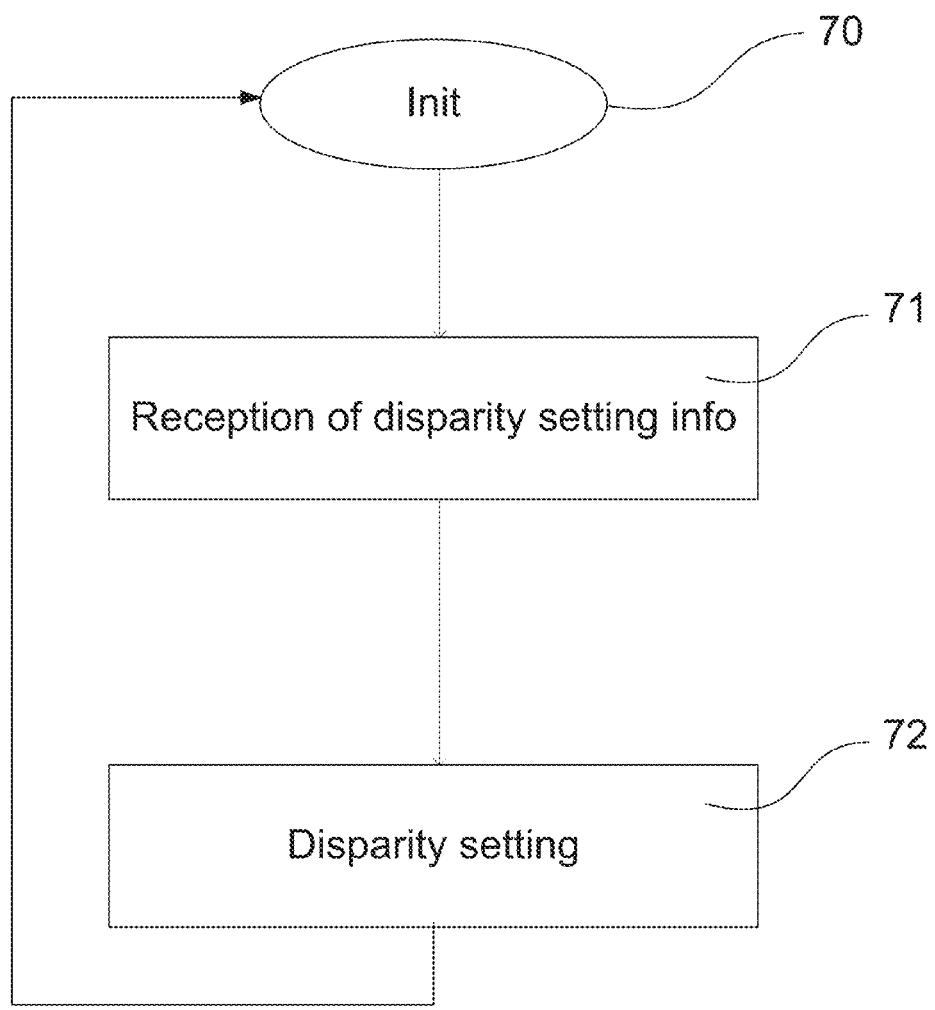

The invention will be better understood, and other specific features and advantages will emerge upon reading the following description, the description making reference to the annexed drawings wherein:

FIGS. 1A and 1B illustrate a network comprising several 3D devices according to two particular embodiments of the invention, FIG. 2 illustrates the sequence of frames of two different 3D contents for rendering on a 3D display device of the network of FIGS. 1A and 1B, according to a particular embodiment of the invention, FIG. 3 diagrammatically illustrates the structure of a processing module of a disparity setting information associated with one or more 3D devices of FIGS. 1A et 1B, according to a particular embodiment of the invention, FIG. 4 illustrates a sequencing of tasks associated with the disparity setting of a 3D content and implementations by two processing modules of FIG. 3, according to a particular embodiment of the invention, FIGS. 5A and 5B illustrate the sequencing of instructions executed by the 3D devices of FIG. 1, according to two particular embodiments of the invention, FIG. 6 illustrates a transmission method of an information representative of a disparity setting implemented in a processing module of FIG. 3, according to a particular embodiment of the invention, FIG. 7 illustrates a disparity setting method implemented in a processing module of FIG. 3, according to a particular embodiment of the invention.

5. DETAILED DESCRIPTION OF EMBODIMENTS OF THE INVENTION

The invention will be described with reference to a first particular embodiment of a transmission method of an information representative of a disparity setting of a stereoscopic image. A stereoscopic image is advantageously composed of a first image (for example a left image) and a second image (for example a right image), the first and the second image representing the same scene seen from two different points of view, the synthesis of the first image and of the second image by the brain of a user enabling the rendering of an image of the scene to be obtained in three dimensions. According to the first particular and non-restrictive embodiment described, an information representative of the disparity setting, that is an information representative of the level of amplitude of the 3D effects contained in the stereoscopic image that a user wishes to have, is transmitted at a given time. The transmission time is determined by taking into account the time period corresponding to the transition between the display of the first image and the display of a second image on a 3D display device. According to a particular and non-restrictive embodiment of the invention, the setting information is transmitted from a module suitable for the generation, the processing and the transmission of such an information, the module being associated with a first 3D device, for example an active pair of glasses, to a second 3D device, for example a 3D device equipped with a module configured to process the setting information. It is understood by 3D device a device suitable for the processing of data representative of one or more stereoscopic images.

The invention will also be described with reference to a second particular embodiment of a setting method of a disparity level of a stereoscopic image. According to the second particular embodiment, an information representative of a disparity setting is received by a 3D device, for example a 3D display device or a 3D source transmitting a 3D content (comprising for example one or more stereoscopic images) to a 3D display device. The setting of the disparity of the stereoscopic image is then applied to the stereoscopic image at a given time according to the setting information received. The time at which the setting is applied is advantageously determined by taking into account the time period corresponding to the transition between the display of the first image and the display of the second image on a 3D display device.

FIG. 1A illustrates a network 1 composed of several 3D devices according to a first particular non-restrictive embodiment of the invention. The network 1 corresponds for example to a domestic network. The network 1 comprises a plurality of 3D devices, i.e. devices able to process data representative of a 3D video content for the rendering of the 3D video content by a system composed of a display device associated with at least one active pair of glasses. Among the 3D devices, the network 1 comprises in particular a gateway 10 (for example of the ADSL or FTTH (Fibre To The Home) or Wimax (Worldwide Interoperability for Microwave Access)), a display screen 14, for example of the LCD, PDP (Plasma Display Panel) or OLED (Organic Light-Emitting Diode) type, a set-top box 13 and two active pairs of glasses 11 and 12.

The gateway 10 is advantageously connected to the set-top box 13 via a wired link, for example of the Ethernet type (according to the ISO/IEC 8802-3 standard). According to a variant, the gateway 10 is linked to the set-top box 13 via a wireless link, for example of the Wifi® type. The set-top box 13 is connected to the display screen 14 via a wired link, for example of the HDMI (High Definition Multimedia Interface) type. According to a variant, the set-top box 13 is connected to the display screen 14 via a wireless link, for example of the Wifi® type. The two active pairs of glasses 11 and 12 are each linked to the display screen 14 via a wireless link, for example of the "Bluetooth" type based on the standard IEEE 802.15.1, of the "Zigbee" type based on the standard IEEE 802.15.4 or of the Wifi® type. These wireless links between the pairs of glasses 11 and 12 and the display screen 14 are illustrated by bidirectional arrows with solid black lines in FIG. 1A. Advantageously, the active pairs of glasses 11 and 12 are associated with the display screen for the rendering of the 3D content 3D displayed on the display screen 14, the right lens (respectively left lens) of an active pair of glasses 11 and 12 being blanked during the display of the left image (respectively right image) of a stereoscopic image on the screen 14. The association of the active pairs of glasses 11 and 12 with the display screen 14 is shown by dotted line arrows between the active pairs of glasses and the display screen 14 in FIG. 1A.

According to one embodiment and advantageously, a first spectator wears the first active pair of glasses 11 and a second spectator wears the second active pair of glasses 12, the first and second spectators both watching the display screen 14. According to this example, both spectators watch a same 3D content with different disparity levels. The first spectator watches for example a first 3D content (for example a first sequence of stereoscopic images representative of a scene) with a first level of disparity and the second spectator watches a second 3D content (that is for example a second sequence of stereoscopic images representative of the same scene as the first sequence of stereoscopic images) with a second disparity level different from the first disparity level. If L1 and R1 represent the left images and the right images respectively of the first 3D content and if L2 and R2 represent the left images and the right images respectively of the second 3D content, the display sequence of the right and left images of the two 3D contents is the following: L1, R1, L2, R2, L1, R1, L2, R2 . . . . The display of the first and second 3D contents is thus sequential from a temporal point of view, the display of the left and right images being also sequential from a temporal point of view for each 3D content. FIG. 2 illustrates such a sequence of information representative of the first and second images of two 3D contents corresponding to the left and right images of stereoscopic images. A frame 20 is temporally divided, the first time slot of the frame 201 comprising the data representative of the left image L1 of the first stereoscopic image of the first 3D content and the following time slot 202 comprising the data representative of the right image R1 of the first stereoscopic image of the first 3D content. A third time slot 203 following the second time slot 202 comprises the data representative of the left image L2 of the first stereoscopic image of the second content and the following time slot 204 comprises the data representative of the right image R2 of the first stereoscopic image of the second 3D content. Then the following time slot 205 comprises the data representative of the left image L1 of the second stereoscopic image of the first 3D content and the following time slot 206 comprises the data representative of the right image R1 of the second stereoscopic image of the first 3D content. Then the following time slot 207 comprises the data representative of the left image L2 of the second stereoscopic image of the second 3D content and the following time slot 208 comprises the data representative of the right image R2 of the second stereoscopic image of the second 3D content and so on. FIG. 2 also illustrates the time slots during which the left lens 21 and the right lens 22 of the first active pair of glasses 11 used for the rendering of the first 3D content are blanked (in black) or let the light pass (in white). The left lens 21 of the first active pair of glasses 11 lets the light pass during the time slots 211 and 212 corresponding temporally to the time slots 201 and 205 of the frame 20 during which the left images L1 of the first 3D content are displayed. During the other time slots of the frame 20, the left lens 21 of the first active pair of glasses 11 is blanked. The right lens 22 of the first active pair of glasses 11 lets the light pass during the time slots 221 and 222 corresponding temporally to the time slots 202 and 206 of the frame 20 during which the right images R1 of the first 3D content are displayed. During the other time slots of the frame 20, the right lens 22 of the first active pair of glasses 11 is blanked. Likewise, the left lens 23 of the second active pair of glasses 12 lets the light pass during the time slots 231 and 232 corresponding temporally to the time slots 203 and 207 of the frame 20 during which the left images L2 of the second 3D content are displayed. During the other time slots of the frame 20, the left lens 23 of the second active pair of glasses is blanked 12. The right lens 24 of the second active pair of glasses lets the light pass during the time slots 241 and 242 corresponding temporally to the time slots 204 and 208 of the frame 20 during which the right images R2 of the first 3D content are displayed. During the other time slots of the frame 20, the right lens 24 of the first active pair of glasses is blanked 12.

Advantageously, the first and second 3D contents correspond to a same video displayed with different disparities between the left and right stereoscopic images, that is with different depth information, that is with different amplitudes at the level of the 3D effects. According to this example, the frame 20 comprises for example in the first time slot 201 data representative of a first left image, in the second time slot 202 following temporally the first slot 201 data representative of a first right image (having a first disparity with respect to the first left image) and in the third time slot 203 following temporally the second slot 202 data representative of a second right image (having a second disparity with respect to the first left image). So, the pairs [first left image/first right image] and [first left image/second right image] represent the same scene (or the same video) but with different depths (i.e. different 3D levels). The same scheme is then repeated for other stereoscopic images, namely temporally: left image, right image with first disparity, right image with second disparity.

According to one variant, the frame 20 is split differently from the example illustrated in FIG. 2. According to this particularly advantageous variant, the frame comprises for example a first time slot of the frame comprising the data representative of the left images of the first and second 3D contents (the 3D contents being according to this example representative of a same scene). The left image corresponding to the first time slot of the frame 20 is thus common to the two 3D contents. The frame thus comprises in a second time slot (directly following the first time slot) comprising the data representative of the right image of the first 3D content (the left image of the first time slot and the right image of the second time slot forming a first stereoscopic image of the first 3D content). Then, a third time slot of the frame 20 (directly following the second time slot) comprises data representative of the right image of the second 3D content (the left image of the first time slot and the right image of the third time slot forming a first stereoscopic image of the second 3D content). The operation of the first 11 and second 12 active pairs of glasses is thus as follows: the right lens of each active pair of glasses 11 and 12 is blanked during the first time slot (the left lens of each active pair of glasses 11 and 12 letting the light through during this first time slot), the left lens of each active pair of glasses 11 and 12 is blanked during the second and third time slots (the right lens of the first pair of glasses 11 letting light through during the second time slot (the right lens of the second pair of glasses 12 being, itself, blanked), the right lens of the second pair of glasses 12 letting the light through during the third time slot (the right lens of the first pair of glasses 11 being, itself, blanked)). Such a temporal division of the frame 20 has the advantage of being able to contain the representative data of the images of several 3D contents by reducing by a maximum the display time between the left image to the 3D contents and each of the right images associated with the different 3D contents, which limits the time during which the left or right lenses are blanked. According to this example it is naturally possible to transport more than two 3D contents in a same frame (for example 3, 4, 5 or 10 contents), each content being representative of the same scene (or same video) but with a different disparity level (hence an amplitude of 3D effects). The principle remains the same with a first data slot comprising the data of a first image (left or right) common to all the contents followed by as many time slots as there are different 3D contents in the frame, the slots following the first each comprising the data of each second image (right or left respectively).

Advantageously, the different 3D contents are obtained by disparity compensated interpolation from a source 3D content. If the 3D content corresponds to a stereoscopic image comprising a first image (left for example) and a second image (right for example), an interpolated image is generated by disparity compensated interpolation from the left and right images of a source (or initial) stereoscopic image. It is thus possible to generate as many interpolated images as required from the source stereoscopic image by causing an interpolation coefficient α to vary, α being advantageously comprised between 0 and 1. To form the new stereoscopic images (each new stereoscopic image corresponding to a 3D content the disparity of which is different from that of the source stereoscopic image), it is possible to form an image pair comprising the source left image and an interpolated image (that thus replaces the source right image), or comprising the source right image and an interpolated image (that thus replaces the source right image) or even comprising two interpolated images (that thus replace the source left and right images).

According to another variant, the first and second 3D contents correspond to different videos, that is that the first 3D content is representative of a first scene and the second 3D content is representative of a second scene different from the first.

FIG. 1B illustrates the network 1 illustrated in FIG. 1A composed of the same 3D devices according to a second particular non-restrictive embodiment of the invention. The 3D devices illustrated in FIG. 1B are identical to the ones in FIG. 1A and have the same reference signs. The difference between FIG. 1B and FIG. 1A lies in the fact that the active pairs of glasses 11 and 12 are connected to the gateways 10 via a wireless link in FIG. 1B. These wireless links are for example of "Bluetooth" type based on the standard IEEE 802.15.1, of "Zigbee" type based on the standard IEEE 802.15.4 or of Wifi® type. These wireless links are used for example to exchange synchronisation information between each of the active pairs of glasses 11 and 12 and the gateway 10 so that the blanking of the left lenses (respectively right lenses) of the active pairs of glasses are synchronised with the display of the right images (respectively left images) of stereoscopic images to display on the display screen 14, the gateway 10 transmitting one or more flows of data representative of 3D content(s) (for example one or more sequences of stereoscopic images) to the set-top box 13 for display on the display screen 14.

FIG. 3 diagrammatically shows a material embodiment of a disparity setting information processing module 3, according to a particular non-restrictive embodiment of the invention.

The processing module 3 comprises the following elements:
- a transmission unit 31 suitable for the transmission and reception of data (for example a synchronisation signal and/or information relating to a setting level of the disparity associated with a 3D or stereoscopic content),
- an antenna 32 connected to the transmission unit 31,
- a microprocessor 33 (or CPU) connected to the transmission unit 31 by an address and data bus that also carries a clock signal,
- a RAM (Random Access Memory) 34 connected to the microprocessor 33 by an address and data bus that also carries a clock signal,
- a unit 35 suitable for the validation of a command and connected to the microprocessor 33 by means of an address and data bus.

The random access memory 34 comprises in particular:
- in a register, the operating programme of the microprocessor 33 responsible for switching on the processing module 3,
- data representative of a disparity setting level required by a user,
- data representative of synchronization.

The algorithms implementing the steps of the method specific to the invention and described below are stored in the RAM 34 memory (or in a ROM memory not shown) associated with the processing module 3 implementing these steps. When powered up, the microprocessor 33 loads and runs the instructions of these algorithms.

It is noted that the word "register" used in the description of the memory 34 designates, in each of the memories mentioned, a memory zone of low capacity (some binary data) as well as a memory zone of large capacity (enabling a whole programme to be stored or all or part of the data representative of data received or to be broadcast).

The unit 35 suitable for the validation of a command advantageously corresponds to any mechanical or electrical device enabling a user to control the setting of the disparity associated with a 3D content. The unit 35 corresponds for example to a push button type switch, to a thumbwheel each increment of which corresponds to a setting level of the disparity, to a touch-sensitive pad suitable for the detection of the pressures exerted upon it, to a voice control device suitable for the recording of voice commands pronounced by a user, these voice commands being interpreted by the microprocessor 33.

The processing module 3 is advantageously integrated into the pairs of glasses 11 and 12. According to a variant, the processing module 3 is separate from the pairs of glasses but suitable to be associated with the pairs of glasses. According to another variant, the processing module 3 is integrated into a remote control associated with the display screen 14.

The processing module 3 is advantageously integrated into the display screen for the processing and interpretation of any disparity setting command signal transmitted by a processing module associated with an active pair of glasses 11 or 12 or with the remote control associated with the display screen. According to this variant, the processing module does not have any unit 35 suitable for the validation of a setting command by a user. According to a variant, such a processing module 3 without setting validation unit 35 is integrated into or associated with the gateway 10, for example when the active pairs of glasses 11 and 12 are connected to the gateways 10, as shown with regard to FIG. 1B.

According to yet another variant, the processing module 3 is a PnP (Plug and Play) module independent from any 3D device (active pair of glasses, display screen, gateway, set-top box). According to this variant, the processing module 3 comprises a USB communication interface of the type USB (Universal Serial Bus) or of type Bluetooth or Zigbee. According to this variant, the processing module suitable to be associated with any 3D device (active pair of glasses, display screen, gateway, set-top box) comprising a suitable communication interface (USB, Bluetooth or Zigbee according to the previous embodiments).

FIG. 4 shows a sequencing of tasks associated with the setting of the disparity of a 3D content, according to a particular non-restrictive embodiment of the invention, FIG. 4 also illustrates the information exchanged between an active pair of glasses L 40 on the one hand and a display screen D 41 on the other hand (or the gateway 10 according to another embodiment). The active pair of glasses 40 and the display screen 41 (or the gateway 10) are each advantageously equipped with a processing module 3 (either integrated directly into the 3D devices, or associated as extension module with the 3D devices).

During an initialisation phase 4001, the processing module associated with display screen recovers the data representative of the viewing conditions of a 3D content on the display screen. The viewing conditions associated with the display screen comprise parameters such as the width of the display screen, the viewing distance associated with the target screen, that is the distance at which it is recommended to watch a 3D content on the display screen, and/or the number of pixels per line of the display screen. From these different parameters, the processing module deduces from them the optimum disparity level for watching a 3D content on the display screen. For example, a same 3D content viewed on a living room flat screen (with a width of for example 1 meter, a resolution of 1920×1080 (that is 1080 lines of 1920 pixels each) and an associated viewing distance of 3 meters) and on a table screen (with a width of 20 cm, a resolution of 1024×768 (that is 768 lines of 1024 pixels each) and an associated viewing distance of 50 cm) will be watched with different disparity levels, that is with different amplitudes of 3D effects. Purely for illustrative purposes, a 3D content viewed on the living room flat screen can be viewed with a disparity level of 100% (corresponding to the maximum disparity between the two images of a source stereoscopic content) whereas the same content viewed on the tablet will be viewed with a disparity level of 50% (that is that the maximum depth and the minimum depth associated with the pixels of the images is reduced by half in relation to the maximum disparity of the source stereoscopic content). The optimum disparity level thus determined is advantageously used as reference disparity level that a user can modify during the setting of the disparity information. According to a variant, this reference disparity level corresponds to the maximum disparity level that a user can obtain by watching a stereoscopic content on a given screen, the disparity setting thus consisting in a reduction of the disparity associated with the stereoscopic content. According to yet another variant, the reference disparity level is not determined from viewing conditions associated with the display screen but is obtained directly from the display screen, this information being for example stored in a memory of the display screen. According to another variant, the reference disparity level is neither determined nor recovered from the display screen. According to this variant, the reference disparity level corresponds to the disparity associated with the source stereoscopic content.

The initialisation phase 4001 advantageously comprises the association of the active pair or pairs of glasses with the display screen or with the gateway when the active pair or pairs of glasses are switched on. When an active pair of glasses is switched on, the latter advantageously receives from the processing module 3 associated with the display screen or with the gateway an information representative of the last disparity setting used to watch a 3D content on the associated display screen (or transmitted by the associated gateway). If no pre-existing setting is recorded, a default disparity level is transmitted to the active pair of glasses, corresponding for example to the reference disparity level associated with the display screen.

Then during a phase 4002, the processing module associated with the display screen (or the gateway) transmits a command signal comprising an information for the transition from the open state to the closed state of a lens and from the closed state to the open state of the other lens of the active pair of glasses (this signal being called subsequently left-right switching signal). The transition from the open to closed state for a lens is directly related to the transition corresponding to the transition from the display of the first image of a stereoscopic image to the display of the second image of this same stereoscopic image on the display screen, as will be described in more detail with respect to FIGS. 5A and 5B. The left-right switching signal can advantageously synchronise the change of state of the lenses of glasses (transition from the open state to the blank state and conversely) with the display transition of the first and second images of a stereoscopic image on the display screen. In other words, the left-right switching signal advantageously corresponds to a synchronisation signal to synchronise an active pair of glasses with a display screen and/or a gateway transmitting data representative of images to display on a display screen.

At a first any time t 401, a user activates the command selecting a setting level to modify the current setting level of the disparity. Depending on the left-right switching signal 4002 received, the processing module associated with the active pair of glasses stores in memory an information representative of a modification of the currently disparity setting (corresponding to the setting required by the user) for a determined time 402 in such a manner as to prevent the setting information from being transmitted during the reception of a left-right switching signal and/or during the state change time (open and closed) of the lenses of the glasses.

The left-right switching signal 4002, 4003, 4005 being advantageously transmitted periodically (for example at regular time slots corresponding to an inter-frame time 410 (a frame corresponding advantageously to a left image or a right image of a stereoscopic image), the time slot during which the information representative of a modification of disparity setting can be transmitted without creating any conflict in the synchronisation between the active pair of glasses and the display screen (or the gateway) has a constant duration and a frequency of occurrence that is also periodic.

When the left-right switching signal 4003 transmitted by the processing module associated with the display screen (or the gateway) and received and interpreted by the processing module associated with the active pair of glasses, the signal 4004 comprising the modification information of the disparity setting is transmitted by the processing module associated with the active pair of glasses. Once the signal is decoded and the information it contains interpreted by the processing module associated with the display screen (or gateway), the new disparity level required by the user is applied 411 to the 3D content displayed on the display screen. The application of a change of disparity level is for example applied by disparity compensated interpolation of the source 3D content, as this was described with regard to FIG. 2.

At a second any time t 40, the user activates a second time the command selecting a new disparity level. This command is stored 404 in a memory of the processing module associated with the active pair of glasses for transmission 4006 to the processing module associated with the display screen (or the gateway) at a timely moment according to the left-right switching signal 4003 received in such a manner so as not to interfere with the synchronisation between the alternating blanking of the left and right lenses of the active pair of glasses and the display of the first and second images of the 3D content displayed on the display screen.

FIG. 5A shows a sequencing of tasks executed by the processing modules 3 of a disparity setting information respectively associated with a display screen 54 (or with a gateway) and with an active pair of glasses 57, according to a first particular non-restrictive implementation embodiment of the invention. FIG. 5A illustrates the temporal constraints associated with the exchange of information between the processing modules of a disparity setting information associated with the 3D devices (typically an active pair of glasses on the one hand and a display screen and/or a gateway on the other hand) involved in the rendering of a 3D content (typically a stereoscopic image comprising a left image and a right image) so that the transmission and/or the processing of the information representative of a disparity setting does not interfere with the synchronisation process set up between the active pair of glasses and the display screen (or the gateway). The illustrated time scale corresponds to the inter-frame time T, that is to say that a first frame representative of a first stereoscopic image is transmitted by the gateway to the display screen at time 0 and that a second frame representative of a second stereoscopic image following temporally the first stereoscopic image is transmitted by the gateway to the display screen at time T. The arrows represented on FIG. 5A each illustrate a task to be executed at a given time, the origin of the arrow indicating at which time the processing of the task corresponding to the arrow is required and the end of the arrow being positioned at the level of the task to carry out.

At a time t1 corresponding to the time 0, the left-right switching signal 51 is transmitted by the processing module (associated with the display screen or the gateway) to the display screen 54 and to the active pair of glasses 57.

At a time t2 after t1, the right lens R 56 of the active pair of glasses 57 goes to the blank state. Indeed, the first image contained in the frame representative of the stereoscopic image corresponds to the left image. Once the left-right switching signal is transmitted, the first task to be carried out taking account of the processing times is the blanking of the right lens. The time slot 561 immediately following the right lens blanking execution request corresponds to the time necessary to change from the non-blank state to the blank state. Once this time 561 has elapsed, the right lens R 56 of the active pair of glasses remains in the blank state during the time slot 562.

At a time t3 after t2, the extraction of the data from the frame transmitted by the gateway to the display screen and the rendering of the left image are started at the level of the display device D 54. The time slot 541 following 3 corresponds to the time necessary to extract the data representative of the left image and to change from the display of the right image of the preceding stereoscopic image to the display of the left image of the current stereoscopic image.

At a time t4 after t3, a user commands the modification of the setting of the current disparity level, the information representative of the required disparity level being stored pending transmission.

At a time t5 after t4, the left lens L 55 of the active pair of glasses 57 changes to the open state after a time corresponding to the time slot 552. The left lens then remains in the open state for the time slot 553 thus allowing the left eye time to visualise the left image displayed on the display screen 54 during the time slot 542.

At a time t6 after t5 a time windows starts corresponding to the time slot 532 during which the information representative of the disparity setting can be transmitted to the processing module associated with the gateway or the display screen without interfering with the left-right switching signal 51 and without interfering with the time intervals 552, 561, 543 and 554 corresponding to the transition times during which each active pair of glasses changes from an open state to a blank state or conversely nor with the time slots 541 and 543 corresponding to the transition times during which one changes from the right image to the left image (or conversely) on the display screen. The temporal window during which the information representative of the disparity setting is transmitted advantageously corresponds to the time periods during which the active pair of glasses and the display device are in an established state (that is in a blank or open state for the active pair of glasses and an established display state for the display screen).

The times t7, t8, t9 and t10 correspond to the times t5, t3, t2 and t6 respectively but for the display of the right image on the display screen (corresponding to the time slot 544) after a transition time 543 to change from the display of the left image to the right image, for the change from the open state to the blank state for the left lens 55 (transition from the time period 553 (open state) to the time period 555 (blank state) including a transition time 554) and for the transition from the blank state to the open state for the right lens 56 so that the latter can see the right image displayed during the time slot 544 (transition from the time period 562 (blank state) to the time period 564 (open state) including a transition time 563). The temporal window during which the information representative of the disparity setting is transmitted without interfering with the left-right switching signal (corresponding to the synchronisation signal) nor with the transition times for the display of the right and left images and for the transitions of the blank state to the open state (or conversely) for the lenses 55, 56 of the pair of glasses 57 starts at time t 10 and corresponds to the time slot 534 during which the active pair of glasses and the display device are in an established state.

The time slots during which it is not timely to transmit the information for setting the disparity level are illustrated by the time slots 531 and 533 which correspond to or cover all the time intervals corresponding to transition phases (slots 541, 551 and 561; 543, 554 and 563).

FIG. 5B shows a sequencing of tasks executed by the processing modules 3 of a disparity setting information respectively associated with a display screen 54 (or with a gateway) and with an active pair of glasses 57, according to a second particular non-restrictive implementation embodiment of the invention. The elements identical to FIG. 5A have identical reference signs used for FIG. 5A. According to this second particular implementation embodiment, the user carries out a second disparity setting at a time t 11. According to this embodiment, the time of the command of the second setting occurs during the temporal window corresponding to the period during which it is possible to transmit a setting information without interfering with the left-right switching signal nor with the different transition periods. The time slot 535 advantageously illustrates the time at which the first disparity setting (commanded at time t4) is executed. The time t 12 thus marks the start of the period during which the information representative of the second setting can be transmitted during the temporal window. If this information representative of the second setting was unable to be transmitted during the temporal window corresponding to the established display of the left image, this information is then transmitted during the temporal window 534 corresponding to the established display of the right image.

It should be noted that any impact of the modification of the disparity following the execution of the first command of the user is not shown in FIG. 5B. As was described in relation to FIG. 2, a change of disparity is advantageously seen in the generation of a new right image for example (from source left and right images) that either replaces the source right image (no impact then being visible in the transitions of state of the lenses of the pair of glasses), or is in integrated into the flow of data representative of the left and right images (for example one left image for two right images generating two pairs of left/right images with different disparity levels, an impact thus being observed on the transitions from a blank to open state (or conversely) of the lenses of the pair of glasses, that is that the left lens remains in the blank state during the display of the two right images and the right lens remains in the blank state during the display of the left image and the right image whose disparity with respect to the left image does not correspond to the required setting level).

FIG. 6 illustrates a transmission method of an information representative of a disparity setting, advantageously implemented in a processing module of FIG. 3, according to a particular non-restrictive embodiment of the invention.

During an initialisation step 60, the different parameters of the processing module associated with the active pair of glasses and those of the processing module associated with the display screen or with the gateway if necessary are updated. In particular, the parameters corresponding to the disparity setting level (for example the reference setting level associated with the screen, the setting level previously used to watch a 3D content on the display screen) and/or to the synchronisation between the active pair of glasses and the display screen or the gateway to synchronise the transition from the blank state to the open state (and conversely) of the lenses of the active pair of glasses with the transition between the display of a first image and the display of a second images of a stereoscopic image are initialised in any manner (for example following reception of initialisation messages sent by the processing module associated with the display screen or with the gateway, or even by commands from an operator).

Next, during a step 61, the transmission time of an information representative of a disparity setting of a stereoscopic image comprising a first image (for example a left image) and a second image (for example a right image) is determined. The transmission time is advantageously determined according to a time period associated with a transition time between the sequential display of the first and second images on a display screen. The display of a first image (for example the left image) being synchronised with the transition from the blank state to the open state of a first lens (the left lens according to the example) so that the latter can see the first image as well as with the transition from the open state to the blank state of a second lens (the right lens according to the example) so that the latter cannot see the first image, the display of a second image (for example the right image) being synchronised with the transition from the open state to the blank state of the first lens (the left lens according to the example) so that the latter cannot see the second image as well as with the transition from the blank state to the open state of the second lens (the right lens according to the example) so that the latter can see the second image, to determine the transmission time according to the transition time between the sequential display of the first and second images on a display screen means determining this transmission time according to the transitions from the open state to the blank state and conversely of the first and second lenses of an active pair of glasses.

Advantageously, taking these time periods into account can determine the transmission time so as to transmit the disparity setting information during a time slot during which one of the lenses of the active pair of glasses is in an established open or blank state.

According to a variant, the transmission time belongs to the start of the time period corresponding to an established state of one of the lenses of the glasses so as to apply the change of disparity to the stereoscopic image as early as possible, for example during the same time period corresponding to an established state of one of the lenses at the start of which the setting information is transmitted.

According to another variant, the transmission time of the setting information is also determined according to a time or a period corresponding to the reception of a synchronisation signal in such a manner as to prevent the transmission time of the setting information from being different from the reception time of the synchronisation signal. The synchronisation signal is advantageously sent by a processing module of the setting information associated with the display screen on which the stereoscopic image is displayed or associated with a gateway connected to the display screen and transmitting a stream of data representative of the stereoscopic image to display on the display screen. The synchronisation signal advantageously corresponds to an information representative of a change of state time (transition from the open state to the blank state or conversely) for each lens of the active pair of glasses, the time to change the state being directly related to the transition times between the display of the first image and the display of the second image. Transmitting the setting information at a different time from the reception time of the synchronisation signal has the advantage of being able to use a half-duplex link.

According to yet another variant, the transmission time concomitant with the reception time of the synchronisation signal, which involves a full-duplex link between the processing module associated with the active pair of glasses and the processing module associated with the display screen (or the gateway).

Once the transmission time is determined, the setting information is advantageously stored in a memory waiting for the transmission time to arrive.

Then in a step 62, the information representative of the disparity setting is transmitted to the destination of processing unit of the disparity setting information associated with the display screen on which is displayed the stereoscopic image or to the destination the processing unit of the disparity setting information associated with the gateway providing the data representative of the stereoscopic image on the display screen or a set-top box connected to the display screen.

The disparity setting information is advantageously transmitted via a wireless transmission channel, for example of the Wifi®, Bluetooth or Zigbee type. The synchronisation signal is also advantageously received by using a wireless transmission channel of the same type.

FIG. 7 shows a disparity setting method, advantageously implemented in a processing module 3 associated with a display screen or a device transmitting data representative of one or more stereoscopic images to a display screen, according to a particular non-restrictive embodiment of the invention.

During an initialisation step 70, the different parameters of the processing module associated with the active pair of glasses and those of the processing module associated with the display screen or with the gateway if necessary are updated. In particular, the parameters corresponding to the disparity setting level (for example the reference setting level associated with the screen, the setting level previously used to watch a 3D content on the display screen) and/or to the synchronisation between the active pair of glasses and the display screen or the gateway to synchronise the transition from the blank state to the open state (and conversely) of the lenses of the active pair of glasses with the transition between the display of a first image and the display of a second images of a stereoscopic image are initialised in any manner (for example following reception of initialisation messages sent by the processing module associated with the display screen or with the gateway, or even by commands from an operator).

Next, during a step 71, an information representative of a disparity setting of a stereoscopic image is received, for example from a processing module of setting information associated with an active pair of glasses. The information is advantageously comprised in a signal received via a wireless transmission channel, for example of the Wifi®, Bluetooth or Zigbee type.

Then during a step 72, the disparity setting corresponding to the setting level comprised in the setting information is applied to the stereoscopic image to display on the display screen. The processing or the application of the disparity setting to the stereoscopic image is advantageously carried out at a time determined according to a transition time between the sequential display of the first and second images forming the stereoscopic image. Taking into account this time period has the advantage of not interfering with the display sequence of the first and second images, which would risk happening if the change of the disparity level was applied to the stereoscopic image during the time slot during which the display moves from the first image to the second image. Changing the disparity level during the transition between the display of the first and second images could lead to delays in decoding the image to display to obtain the required disparity level, leading for example to synchronisation problems with the active pair of glasses coupled to the display screen.

Determining the processing time of the disparity setting at the level of the processing module of the disparity setting information associated with the device receiving the setting information enables the processing module sending this information to transmit the setting information at any moment without constraints, no timeout of the transmission of the information thus being required.

According to one variant, the method comprises a transmission step of a synchronisation signal to one or more active pairs of glasses. The synchronisation signal comprises an information representative of the display sequence of the first and second images so that the first and second lenses of the active pair of glasses is in the open state or in the blank state according to whether the first image or the second image is displayed.

According to another variant, the method comprises a storage step of the information representative of the disparity setting received in a memory awaiting the application of the setting to the stereoscopic image at the time previously determined.

Advantageously, the processing time of the setting belongs to a time slot corresponding to the established display of the first image or of the second image, that is at a time period different from the transition periods between the display of the first and second images.

Naturally, the invention is not limited to the embodiments previously described.

In particular, the invention is not restricted to a transmission method of a disparity information, to a disparity setting method and to a device configured for the transmission of a disparity setting information but extends to any system comprising the device configured for the transmission and to any system implementing the setting method, for example a display screen comprising a processing module of the setting information.

Advantageously, the format of the 3D contents rendered by the 3D devices corresponds to any format of 3D video content known by those skilled in the art and is not limited to a 3D content of the stereoscopic image type comprising a left image and a right image. The 3D content corresponds for example to a video image with which a disparity map is associated or even to a pair of left and right images, a disparity map of the left image with respect to the right image being associated with the left image and a disparity map of the right image with respect to the left image being associated with the right image. According to one variant, the 3D content corresponds to a stereoscopic image comprising more than two views, for example 3, 4, 5 or 10 views.

The invention claimed is:

1. A method of transmitting information representative of a disparity setting of a stereoscopic image by an active pair of glasses, said disparity setting being representative of an amplitude of a 3-dimensional effect, said stereoscopic image comprising a first image and at least a second image representative of a same scene according to two different viewpoints, wherein the method comprises transmitting by said active pair of glasses said information representative of the disparity setting at a determined time, said determined time belonging to a time slot during which a lens of the active pair of glasses is in one of an established open or closed state.

2. The method according to claim 1, wherein the time slot during which a lens of an active pair of glasses is in one of said established open or closed state is determined according to a reception time of a synchronization signal.

3. The method according to claim 1, wherein said determined time corresponds to the start of the time slot during which one lens of said active pair of glasses is in one of said established open or closed state.

4. The method according to claim 1, further comprising storing the information representative of a disparity setting in a memory before transmission.

5. The method according to claim 1, wherein said information representative of a disparity setting is transmitted via a wireless transmission channel.

6. The method according to claim 1, wherein said stereoscopic image belongs to a video stream comprising a first image and at least two second images, a different disparity information being associated with each second image.

7. An active pair of glasses for transmission of information representative of a disparity setting of a stereoscopic image comprising a first image and a second image, wherein said disparity setting is representative of an amplitude of a 3-dimensional effect, wherein said active pair of glasses comprises a transmitter that transmits said information representative of a disparity setting, and a processor that computes a transmission time of said information representative of the disparity setting belonging to a time slot during which a lens of said active pair of glasses is in one of an established open or closed state.

8. The active pair of glasses according to claim 7, further comprising a receiver that receives a synchronization signal comprising information representative of a display sequence of the first and second images.

9. The active pair of glasses according to claim 7, further comprising a disparity controller that modifies the disparity setting of the stereoscopic image.

10. The active pair of glasses according to claim 7, wherein the time slot during which a lens of said active pair of glasses is in one of said established open or closed state is determined according to a reception time of a synchronization signal.

11. The active pair of glasses according to claim 7, wherein said determined time corresponds to a start of the time slot during which one lens of said active pair of glasses is in one of said established open or closed state.

12. The active pair of glasses according to claim 7, further comprising a memory configured to store the information representative of a disparity setting in a memory before transmission.

13. The active pair of glasses according to claim 7, wherein said information representative of a disparity setting is transmitted via a wireless transmission channel.

14. The active pair of glasses according to claim 7, wherein said stereoscopic image belongs to a video stream comprising a first image and at least two second images, a different disparity information being associated with each second image.

\* \* \* \* \*